United States Patent
Yu et al.

(10) Patent No.: US 11,006,037 B2
(45) Date of Patent: May 11, 2021

(54) IMAGING SYSTEM AND METHOD

(71) Applicant: SZ DJI TECHNOLOGY CO., LTD., Shenzhen (CN)

(72) Inventors: Lifu Yu, Shenzhen (CN); Jiaxiang Fang, Shenzhen (CN); Shunnian Li, Shenzhen (CN); Zisheng Cao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 115 days.

(21) Appl. No.: 15/992,678

(22) Filed: May 30, 2018

(65) Prior Publication Data

US 2018/0278834 A1    Sep. 27, 2018

Related U.S. Application Data

(63) Continuation of application No. PCT/CN2015/096025, filed on Nov. 30, 2015.

(51) Int. Cl.
*H04N 5/232* (2006.01)
*G02B 7/04* (2021.01)
*B64C 39/02* (2006.01)

(52) U.S. Cl.
CPC ..... *H04N 5/232127* (2018.08); *B64C 39/024* (2013.01); *G02B 7/04* (2013.01);
(Continued)

(58) Field of Classification Search
CPC ... B64C 2201/127; B64C 39/024; G02B 7/04; H04N 5/232; H04N 5/23203; H04N 5/23212; H04N 5/23216
See application file for complete search history.

(56) References Cited

U.S. PATENT DOCUMENTS 4,749,268 A * 6/1988 Moskovich ............ G02B 7/102
359/698
4,950,061 A * 8/1990 Tsurukawa ............... G02B 7/10
359/696
(Continued)

FOREIGN PATENT DOCUMENTS

CN    101794056 A    8/2010
CN    102298245 A    12/2011
(Continued)

OTHER PUBLICATIONS

The World Intellectual Property Organization (WIPO) International Search Report and Written Opinion for PCT/CN2015/096025 dated Aug. 24, 2016 7 Pages.
(Continued)

*Primary Examiner* — Peter D Le
(74) *Attorney, Agent, or Firm* — Anova Law Group, PLLC

(57) ABSTRACT

A system for focusing an imaging device according to a focal distance setting and methods for making and using same. The focal distance setting can be an infinite focal distance setting for objects that are far away from the imaging device. Focusing of the imaging device can be triggered by activation of a button for "one-touch" rapid focusing. The focusing, for example, can be triggered at a terminal that is distal from the imaging device through an app and suitable user interface. The focal distance setting can be determined by interaction via the app, which can present a prompt to direct the imaging device to an object at a suitable distance. Once determined, the focal distance setting can be stored and later retrieved for rapid focusing. The present system and methods advantageously can be used aboard a mobile platform such as an unmanned aerial vehicle.

16 Claims, 10 Drawing Sheets

(52) U.S. Cl.
CPC ......... *H04N 5/232* (2013.01); *H04N 5/23203* (2013.01); *H04N 5/23212* (2013.01); *H04N 5/23216* (2013.01); *H04N 5/232123* (2018.08); *B64C 2201/127* (2013.01)

(56) References Cited

U.S. PATENT DOCUMENTS

| | | | | |
|---|---|---|---|---|
| 4,978,981 A * | 12/1990 | Satoh | ............... | G03B 7/20 396/213 |
| 4,991,944 A * | 2/1991 | Hirao | ............... | G02B 7/102 348/347 |
| 5,159,370 A * | 10/1992 | Takahashi | ............... | G02B 7/102 359/696 |
| 5,164,756 A * | 11/1992 | Hirasawa | ............... | G02B 7/102 396/81 |
| 5,369,461 A * | 11/1994 | Hirasawa | ............... | H04N 5/23209 348/347 |
| 5,422,699 A * | 6/1995 | Sato | ............... | G02B 7/282 396/133 |
| 5,479,234 A * | 12/1995 | Kitaoka | ............... | G02B 7/28 396/103 |
| 5,479,236 A * | 12/1995 | Tanaka | ............... | G03B 5/00 348/208.11 |
| 5,581,250 A * | 12/1996 | Khvilivitzky | ............... | G01S 11/12 340/945 |
| 6,061,524 A * | 5/2000 | Uno | ............... | G03B 17/425 396/132 |
| 6,317,199 B1 * | 11/2001 | Suzuki | ............... | G01C 1/02 356/4.01 |
| 6,343,191 B1 * | 1/2002 | Watanabe | ............... | G03B 17/48 348/64 |
| 6,405,975 B1 * | 6/2002 | Sankrithi | ............... | B64D 47/08 244/1 R |
| 6,430,368 B1 * | 8/2002 | Hata | ............... | H04N 5/23212 348/E5.045 |
| 6,519,359 B1 * | 2/2003 | Nafis | ............... | G06T 17/00 348/46 |
| 6,970,201 B1 * | 11/2005 | Neil | ............... | G02B 15/173 348/335 |
| 7,319,487 B2 * | 1/2008 | Fujii | ............... | H04N 5/23212 348/353 |
| 7,609,958 B2 * | 10/2009 | Border | ............... | H04N 5/23212 348/348 |
| 8,405,322 B1 * | 3/2013 | Bunn | ............... | H04N 5/2252 315/294 |
| 2002/0080242 A1 * | 6/2002 | Takahashi | ............... | H04N 5/217 348/207.99 |
| 2002/0080257 A1 * | 6/2002 | Blank | ............... | H04N 5/23212 348/345 |
| 2002/0093577 A1 * | 7/2002 | Kitawaki | ............... | H04N 1/4097 348/241 |
| 2002/0118966 A1 * | 8/2002 | Hofer | ............... | G02B 7/102 396/79 |
| 2002/0135688 A1 * | 9/2002 | Niikawa | ............... | H04N 5/217 348/251 |
| 2003/0071911 A1 * | 4/2003 | Shinohara | ............... | H04N 5/23212 348/370 |
| 2004/0004614 A1 * | 1/2004 | Bacus | ............... | G02B 21/367 345/419 |
| 2004/0036795 A1 * | 2/2004 | Fujii | ............... | H04N 5/23212 348/349 |
| 2004/0061949 A1 * | 4/2004 | Yakita | ............... | G02B 7/102 359/697 |
| 2004/0189856 A1 * | 9/2004 | Tanaka | ............... | H04N 5/23212 348/345 |
| 2005/0062876 A1 * | 3/2005 | Okutani | ............... | H04N 5/2252 348/371 |
| 2006/0055787 A1 * | 3/2006 | Hirota | ............... | G03B 5/00 348/208.5 |
| 2006/0082663 A1 * | 4/2006 | Rooy | ............... | H04N 5/2624 348/231.99 |
| 2006/0146009 A1 * | 7/2006 | Syrbe | ............... | A63F 13/00 345/156 |
| 2006/0198632 A1 * | 9/2006 | Kingetsu | ............... | G03B 17/04 396/529 |
| 2010/0039532 A1 * | 2/2010 | Galstian | ............... | H04N 5/2254 348/231.99 |
| 2011/0074963 A1 * | 3/2011 | Awazu | ............... | G03B 5/00 348/208.4 |
| 2011/0128392 A1 * | 6/2011 | Kumagai | ............... | G03B 5/00 348/208.5 |
| 2012/0154547 A1 * | 6/2012 | Aizawa | ............... | G02B 30/52 348/47 |
| 2013/0107062 A1 | 5/2013 | Okazaki | | |
| 2013/0141539 A1 * | 6/2013 | Awazu | ............... | G03B 9/02 348/46 |
| 2015/0124155 A1 * | 5/2015 | Li | ............... | G03B 13/36 348/349 |
| 2015/0350511 A1 * | 12/2015 | Kaikumaa | ............... | G03B 7/00 348/363 |
| 2017/0154454 A1 * | 6/2017 | Akahane | ............... | G06T 11/60 |

FOREIGN PATENT DOCUMENTS

| | | |
|---|---|---|
| CN | 102420943 A | 4/2012 |
| CN | 102866489 A | 1/2013 |
| CN | 103048765 A | 4/2013 |
| CN | 103795927 A | 5/2014 |
| CN | 103813094 A | 5/2014 |
| CN | 104469168 A | 3/2015 |
| CN | 104516170 A | 4/2015 |
| CN | 104635319 A | 5/2015 |
| CN | 104729484 A | 6/2015 |
| CN | 105100605 A | 11/2015 |

OTHER PUBLICATIONS

Jinduo Yan, Junior High School Physics, Feb. 1995, p. 235, China.

* cited by examiner

US 11,006,037 B2

IMAGING SYSTEM AND METHOD

CROSS-REFERENCE TO RELATED APPLICATION

This application is a continuation of International Application No. PCT/CN2015096025, filed on Nov. 30, 2015, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to imaging and more particularly, but not exclusively, to systems and methods for focusing an imaging device.

BACKGROUND

Imaging devices can be focused by adjusting an angle of light passing through a lens of the imaging device. When the light originates from distant points, light rays entering the imaging device are effectively parallel, and the focal distance is said to be infinite. Traditional focusing techniques rely on gradual adjustment of a focal mechanism of the imaging device, allowing distant objects to come into focus through incremental adjustment and refinement.

Such gradual focusing techniques, however, can be slow and inefficient. Even when some aspects of these traditional focusing techniques are performed automatically, a user is typically required to make manual adjustments to refine the focus on distant objects. Where focusing on distant objects is frequently desired, traditional focusing techniques are especially cumbersome and disadvantageous. In particular, imaging that is performed on mobile platforms are frequently used in outdoor environments in which focusing to an infinite focal distance is often desired.

In view of the foregoing, there is a need for improved imaging systems and methods for conveniently and rapidly focusing an imaging device to a particular focal distance, such as an infinite focal distance.

SUMMARY

In accordance with a first aspect disclosed herein, there is set forth a method of focusing an imaging device, comprising:
 retrieving a predetermined focal distance setting of the imaging device; and
 focusing the imaging device according to the focal distance setting.

In accordance with another aspect disclosed herein, there is set forth a system comprising:
 an imaging device having a focal mechanism for focusing the imaging device; and
 one or more processors electrically connected to the imaging device, and configured to retrieve a predetermined focal distance setting of the imaging device; and control the focal mechanism to focus the imaging device according to the predetermined focal distance setting.

In accordance with another aspect disclosed herein, there is set forth a mobile platform comprising:
 an imaging device having a focal mechanism for focusing the imaging device; and
 one or more processors electrically connected to the imaging device, and configured to retrieve a predetermined focal distance setting of the imaging device; and control the focal mechanism to focus the imaging device according to the predetermined focal distance setting.

In accordance with another aspect disclosed herein, there is set forth a terminal for focusing an imaging device that is distal from the terminal, comprising:
 one or more processors configured to retrieve a predetermined focal distance setting of the imaging device; and
 a user interface configured to enable a user to focus the imaging device according to the focal distance setting.

In accordance with another aspect disclosed herein, there is set forth a computer readable storage medium, comprising:
 instruction for retrieving a predetermined focal distance setting of an imaging device; and
 instruction for focusing the imaging device according to the focal distance setting.

In accordance with another aspect disclosed herein, there is set forth a processing system, comprising:
 a retrieving module for retrieving a predetermined focal distance setting of an imaging device; and
 a focusing module for focusing the imaging device according to the focal distance setting.

Figure 1:
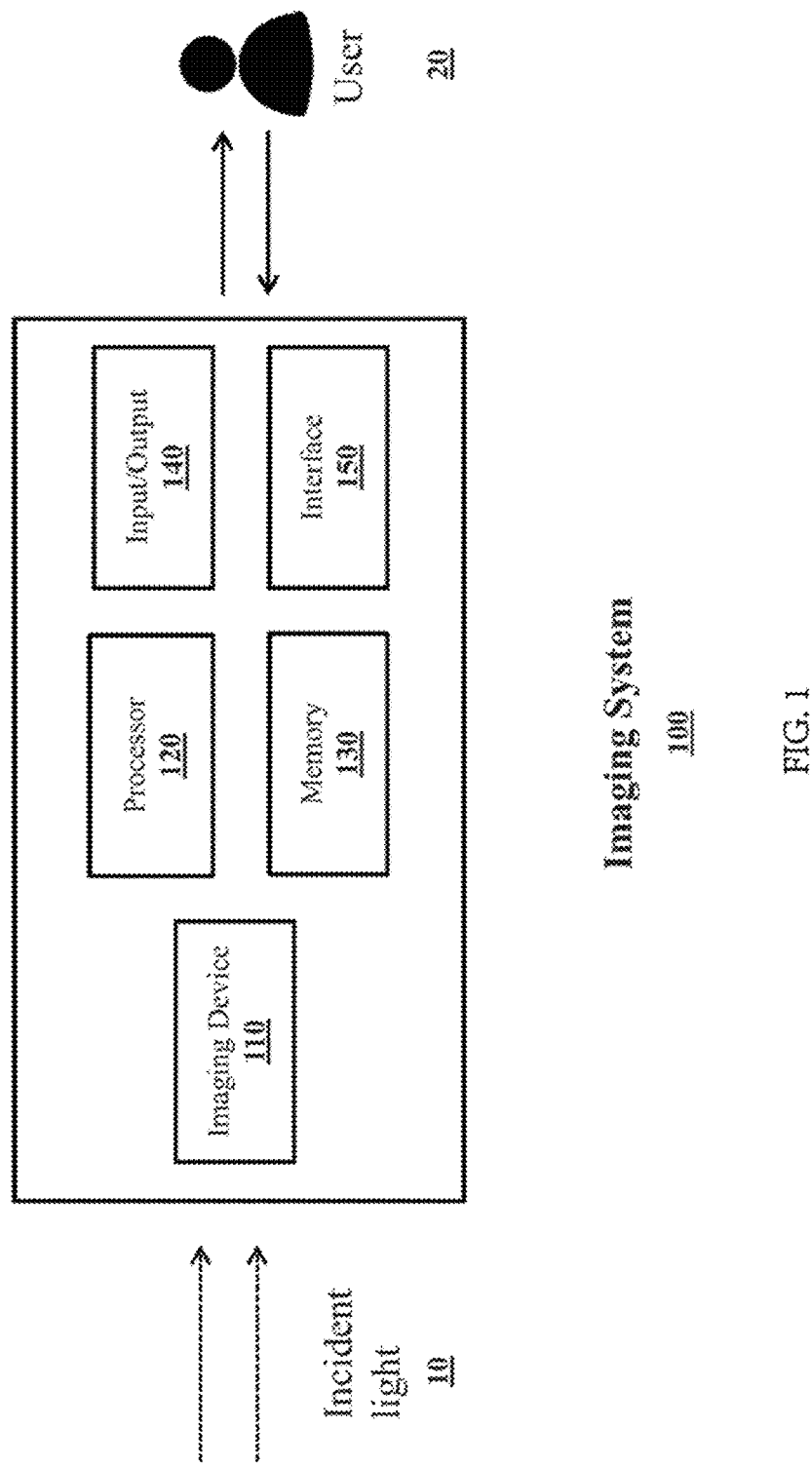
FIG. 1 is an exemplary top-level block diagram illustrating an embodiment of an imaging system having an imaging device.

It should be noted that the figures are not drawn to scale and that elements of similar structures or functions are generally represented by like reference numerals for illustrative purposes throughout the figures. It also should be noted that the figures are only intended to facilitate the description of the illustrative embodiments. The figures do not illustrate every aspect of the described embodiments and do not limit the scope of the present disclosure.

DETAILED DESCRIPTION OF THE EMBODIMENTS

The present disclosure sets forth systems and methods for rapidly and efficiently focusing an imaging device, which systems and methods overcome the limitations of traditional focusing methods. In particular, in some embodiments, the disclosed system and method can enable a user to, with the touch of a single button, rapidly and efficiently direct an imaging device to focus to a particular focal distance using a predetermined focal distance setting. This "one-touch" rapid focus feature is especially useful for infinite focal distances, which are often used while imaging on mobile platforms such as unmanned aerial vehicles (UAVs).

Turning now to FIG. 1, an exemplary imaging system 100 is shown as including an imaging device 110. The imaging device 110 can receive incident light 10 from an external environment and can convert the incident light 10 into digital and/or analog signals (not shown). The signals can be processed to produce an image that can be displayed to a user 20. Exemplary imaging devices 110 suitable for use with the imaging system 100, include, but are not limited to, commercially-available cameras and camcorders. Although a single imaging device 110 is shown for illustrative purposes only, the imaging system 100 can include any predetermined number of imaging devices 110, as desired. For example, the imaging system 100 can include 2, 3, 4, 5, 6, or even a greater number of imaging devices 110. Advantages of using multiple imaging devices 110 in the imaging system 100 can include, for example, enabling stereoscopic imaging for depth perception.

As shown in FIG. 1, the imaging system 100 can include one or more processors 120. Although a single processor 120 is shown for illustrative purposes only, the imaging system 100 can include any number of processors 120, as desired. Without limitation, each processor 120 can include one or more general purpose microprocessors (for example, single or multi-core processors), application-specific integrated circuits (ASIC), field-programmable gate arrays (FPGA), application-specific instruction-set processors, digital signal processing units, coprocessors, network processing units, audio processing units, encryption processing units, and the like. In certain embodiments, the processor 120 can include an image processing engine or media processing unit, which can include specialized hardware for enhancing the speed and efficiency of focusing, image capture, filtering, Bayer transformations, demosaicing operations, noise reduction operations, image sharpening operations, image softening operations, and the like.

The processors 120 can be configured to perform any of the methods described herein, including but not limited to a variety of operations relating to focusing the imaging device 110. In some embodiments, the processors 120 can include specialized software and/or hardware for processing operations relating to focusing—for example, retrieving or storing a focal distance setting S (shown in FIG. 4) and/or adjusting a focal mechanism 114 (shown in FIG. 2) of the imaging device 110 based on the focal distance setting S.

As shown in FIG. 1, the imaging system 100 can further include at least one computer readable storage medium (or memory) 130. The memory 130 can include, for example, random access memory (RAM), static RAM, dynamic RAM, read-only memory (ROM), programmable ROM, erasable programmable ROM, electrically erasable programmable ROM, flash memory, secure digital (SD) card, and the like. The memory 130 can be used to store, for example, a focal distance setting S, and/or other data and parameters relating to focusing the imaging device 110. Furthermore, instruction for performing any of the methods described herein can be stored in the memory 130. The instructions can be relayed to the processors 120 by any suitable means of communication. The instructions can subsequently be executed by the processors 120.

As shown in FIG. 1, the imaging system 100 can include one or more input/output devices 140, for example, buttons, a keyboard, keypad, trackball, displays, and/or a monitor. The input/output devices can be used to operate a suitable user interface (not shown) for interacting with a user 20 for focusing the imaging device 110. The imaging system 100 or components thereof can further include one or more interfaces 150 for communication with other components of the imaging system 100 as well as with external components. Suitable data interfaces include, for example, universal serial bus (USB), digital visual interface (DVI), display port, serial ATA (SATA), IEEE 1394 interface (also known as FireWire), serial, video graphics array (VGA), super video graphics array (SVGA), small computer system interface (SCSI), high-definition multimedia interface (HDMI), audio ports, and/or proprietary interfaces. The imaging system 100 can include one or more additional hardware components (not shown), as desired.

In some embodiments, the components of the imaging system 100 described herein can be components of a kit (not shown) for assembling an apparatus (not shown) for focusing an imaging device 110. The processor 120, memory 130, input/output 140, and/or interfaces 150 can be placed in communication, either directly or indirectly, with the imaging device 110 when the apparatus is assembled. Some embodiments include a processing system (not shown) including one or more modules to perform any of the methods disclosed herein. For example, the processing system can include a module for retrieving a predetermined focal distance setting S of the imaging device 110; a module for focusing the imaging device 110 according to the focal distance setting S, and/or a module for determining the focal distance setting S.

Figure 2:
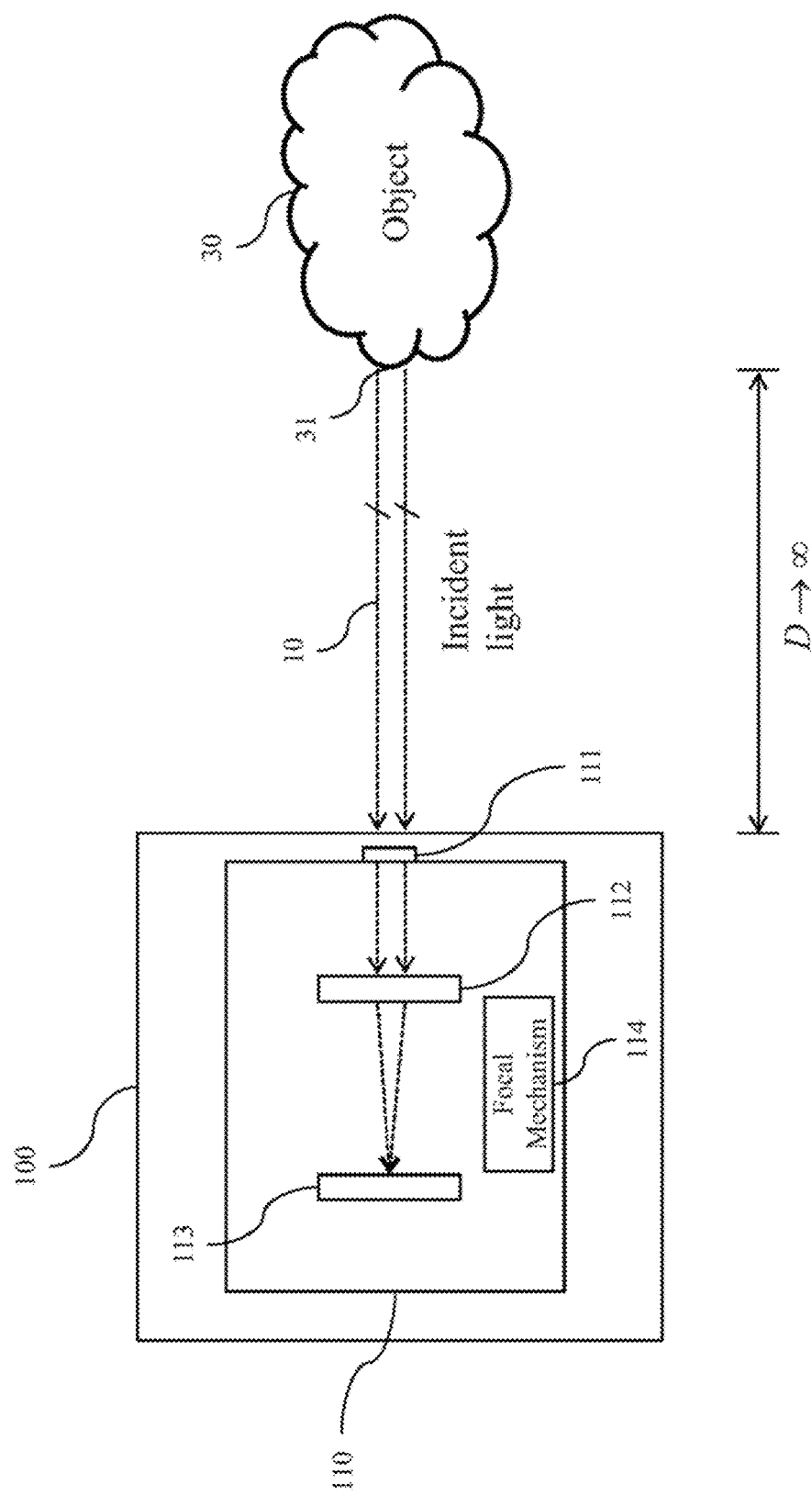
FIG. 2 is an exemplary block diagram illustrating an alternative embodiment of the imaging system of FIG. 1, wherein the imaging device includes a focal mechanism.

Turning now to FIG. 2, the imaging system 100 of FIG. 1 is shown as including an exemplary imaging device 110. The imaging device 110 can receive the rays of incident light 10 originating (and/or reflected) from a point-of-origin 31 of an object 30. The rays of incident light 10 can be received through an aperture 111 of the imaging device 110. The point-of-origin 31 is shown as being located a focal distance D away from the imaging device 110. When the focal distance D is sufficiently large, the rays of incident light 10 from the point-of-origin 31 are effectively parallel to each other when travelling through the aperture 111. Under these circumstances, the focal distance D is referred to herein as being an infinite focal distance.

As shown in FIG. 2, after travelling through the aperture 111, the incident light can be focused using a lens 112 situated within the imaging device 110. For example, the lens 112 can comprise a converging lens for focusing the rays of light from the point-of-origin 31 onto a common point, thereby improving the clarity of the resulting image. Exemplary lenses 112 that are suitable for the imaging system 100 include, without limitation, a single-lens reflex (DSLR) lens, a pin-hole lens, a biological lens, a simple convex glass lens, a macro lens, a zoom lens, a telephoto lens, a fisheye lens, a wide-angle lens, and the like.

After being focused by the lens 112, the incident light can be directed onto one or more photosensors 113 of the imaging device 110. The photosensors 113 perform the function of sensing the incident light and converting the sensed light into analog and/or digital signals that can be ultimately rendered as an image. Suitable photosensors 113 can include analog photosensors 113 (for example, video camera tubes) and/or digital photosensors 113 (for example, charge-coupled device (CCD), complementary metal-oxide-semiconductor (CMOS), N-type metal-oxide-semiconductor (NMOS) imaging devices and hybrids/variants thereof). In certain embodiments, the imaging device 110 can include a photosensor array (not shown), each element of which can capture one pixel of image information. Increasing the number of photosensor elements increases the resolution of the imaging device 110 in corresponding fashion. In some embodiments, the imaging device 110 has a resolution of at least 0.1 Megapixels, 0.5 Megapixels, 1 Megapixel, 2 Megapixels, 5 Megapixels, 10 Megapixels, 20 Megapixels, 50 Megapixels, 100 Megapixels, or an even greater number of pixels.

In some embodiments, the imaging device 110 can also include an apparatus (not shown) that separates and/or filters the sensed light based on color and directs the light onto the appropriate photosensors 113. For example, the imaging device 110 can include a color filter array that passes red, green, and/or blue light to selected pixel sensors and forms an interlaced color mosaic grid in a Bayer pattern. Alternatively, for example, the imaging device 110 can include an array of layered pixel photosensor elements that separates light of different wavelengths based on the properties of the photosensors 113.

In some embodiments, the imaging device 110 can have one or more additional sensors (not shown) for use in various applications such as thermography, creation of multi-spectral images, infrared detection, gamma detection, x-ray detection, and the like. The imaging device 110 can include, for example, electro-optical sensors, thermal/infrared sensors, color or monochrome sensors, multi-spectral imaging sensors, spectrophotometers, spectrometers, thermometers, and/or illuminometers.

As shown in FIG. 2, the imaging device 110 can include a focal mechanism 114 for adjusting predetermined focal properties of the imaging device 110. One or more selected components of the imaging device 110 can be adjusted to a setting that focuses images received from a distance D. Stated somewhat differently, the components of the imaging device can be adjusted to a focal distance D. Settings of the imaging device 110 that can be adjusted for focusing include, for example, a width of the aperture 111, a curvature of the lens 112, and a distance between the lens 112 and the photosensors 113. The settings of the components of the imaging device 110 for a particular focal distance D are herein collectively referred to as the focal distance setting $S_D$, for that focal distance D. The focal mechanism 114 can include any mechanism or mechanisms of the imaging device 110 that can control, manipulate, and/or alter the focal distance setting $S_D$. The focal distance setting $S_D$ can include one or more parameters that are physical settings of components of the imaging device 110 for a particular focal distance D. In some embodiments, the focal distance setting $S_D$ can be predetermined prior to use. For example, the predetermined focal distance setting $S_D$ can be stored in the memory 130 (shown in FIG. 1) of the imaging system 100 and retrieved when needed (for example, on user demand or automatically triggered). Once the focal distance setting $S_D$ is retrieved, the focal mechanism 114 can physically adjust the components of the imaging device 110 such that the focal distance D is set to a preordained value.

In some embodiments of the imaging system 100, a user 20 (shown in FIG. 1) can directly interact physically with the imaging system 100 for focusing. For example, the user 20 can view a current focal state of the imaging system 100 through a monitor or viewfinder that is a part of the input/output 140 of the imaging system 100. The user 20 can further control focusing operations on the imaging system 100 by pressing a button (not shown) that can be part of the input/output 140 (shown in FIG. 1) of the imaging system 100.

Figure 3:
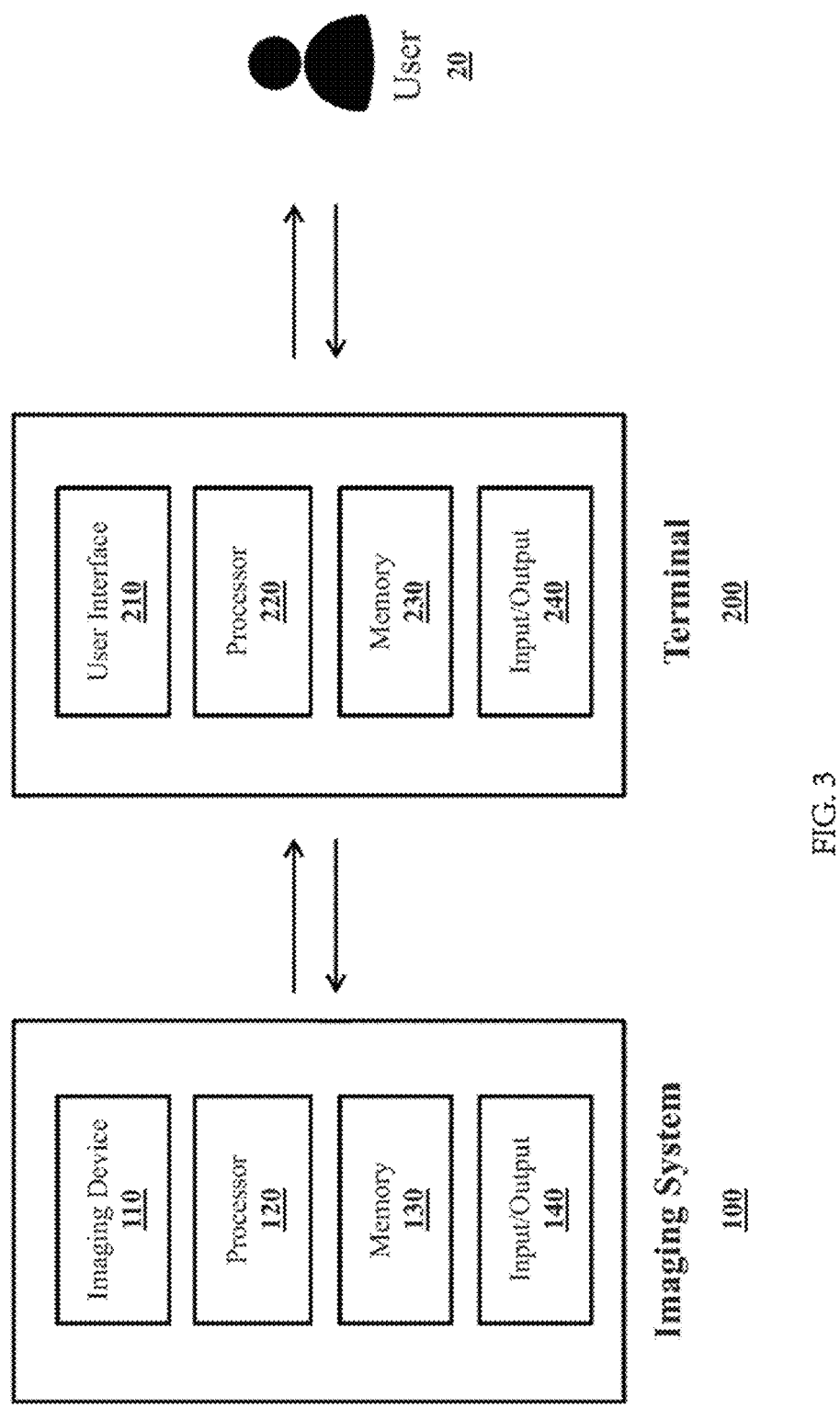
FIG. 3 is an exemplary top level diagram illustrating another alternative embodiment of the imaging system of FIG. 1, wherein the imaging system is shown as interacting with a remote terminal.

In some embodiments of the imaging system 100, a user 20 can indirectly interact with the imaging system 100 for focusing through a terminal 200. FIG. 3 shows an exemplary terminal 200 as interacting with the user 20 to focus an imaging system 100. The terminal 200 can be a remote terminal that is distal from an imaging device 110 of the imaging system 100. Exemplary terminals 200 suitable for the imaging system 100 include, without limitation, application-specific devices such as remote controllers, as well as general-purpose devices such portable computers, laptops, mobile devices, handheld devices, mobile telephones (for example, smartphones), tablet devices, tablet computers, personal digital assistants, handheld consoles, portable media players, wearable devices (for example, smartwatches and head-mounted displays), and the like.

Various technologies can be used for remote communication between the imaging device 110 and the terminal 200. Suitable communication technologies include, for example, radio, Wireless Fidelity (Wi-Fi), cellular, satellite, and broadcasting. Exemplary wireless communication technologies include, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT), and others.

As shown in FIG. 3, the terminal 200 can include a user interface 210 for interacting with the user 20 to focus the imaging device 110. The user interface 210 can be implemented through one or more input/output devices 240 of the terminal 200. For example, the terminal 200 can include a monitor that displays a view through a viewfinder (not shown) of the imaging device 110. The terminal 200 can further display elements of the user interface 210 such as windows, buttons, menus, icons, pop-ups, tabs, controls, cursors, insertion points, and the like. Alternatively, and/or additionally, the user 20 can interact with the terminal using hardware input devices 240 such as buttons, switches, dials, keyboards, keypads, trackballs, and the like.

In some embodiments, the user interface 210 can be provided at least in part via application software (colloquially known as an "app") installed on the terminal 200. For example, where the terminal 200 is a mobile device, the app can be made available and kept updated by a vendor through a mobile app store. Through the app, the vendor can provide any functionality that is useful for the user 20 to remotely control focusing the imaging device 110. This mode of allowing the user 20 to remotely control focusing the imaging device 110 is particularly advantageous where the imaging device 110 is associated with a mobile platform 1000, as described in further detail below with respect to FIG. 10. In some embodiments, the app can include a "one-touch" focus feature, in which the user 20 can focus the imaging device 110 to a predetermined focal distance setting by tapping a single button or other user interface element (or, alternatively a single sequence of buttons and/or other user interface elements).

In some embodiments, the imaging system 100 and the terminal 200 can share use of the same processor and/or memory. In other embodiments, the imaging system 100 and the terminal 200 each has one or more distinct processors and/or memories. The latter configuration is shown in FIG. 3, in which a processor 220 and memory 230 of the terminal 200 are designated with separate reference numerals from the processor 120 and memory 130 of the imaging system 100. The processor 220 of the terminal 200 can be used for any operation relating to focusing described herein, including but not limited to controlling the user interface 210, controlling transmissions to the imaging system 100 remotely, processing signals retrieved from the imaging system 100, storing a focal distance setting S in a memory 230 of the terminal 200, and/or retrieving the focal distance setting S from the memory 230.

Figure 4:
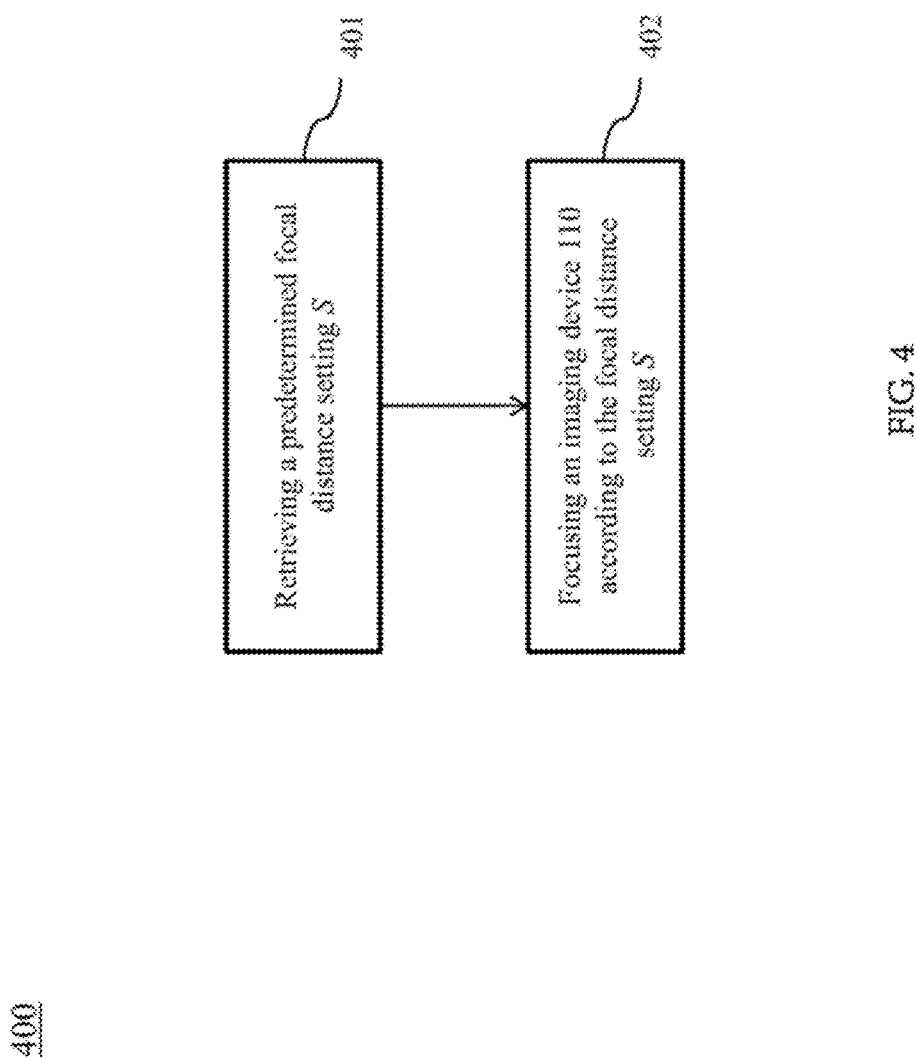
FIG. 4 is an exemplary top-level flow chart illustrating an embodiment of a method for focusing the imaging device of FIG. 1.

Referring now to FIG. 4, one embodiment of a method 400 for focusing an imaging device 110 is illustrated. At 401, a predetermined focal distance setting S of the imaging device 110 is retrieved. The focal distance setting S can include one or more parameters that specify a setting of the imaging device 110 and/or selected components of the imaging device 100. When the imaging device 110 and/or the selected components thereof are configured according to the focal distance setting $S_D$, the imaging device 110 will be focused to one or more objects 30 that are a focal distance D away from the imaging device 110. A focal distance setting $S_D$ can be specified for any suitable focal distance D. In some embodiments, the focal distance D specified by the focal distance setting $S_D$ can be a non-infinite focal distance. For example, the focal distance D can range from 1 to 10 millimeters, 2 to 20 millimeters, 5 to 50 millimeters, 10 to 100 millimeters, 20 to 200 millimeters, 50 to 500 millimeters, 100 millimeters to 1 meter, 200 millimeters to 2 meters, 500 millimeters to 5 meters, 1 to 10 meters, 2 to 20 meters, 5 to 50 meters, 10 to 100 meters, 20 to 200 meters, 50 to 500 meters, 100 meters to 1 kilometer, 200 meters to 2 kilometers, 500 meters to 5 kilometers, 1 to 10 kilometers, 2 to 20 kilometers, 5 to 50 kilometers, 10 to 100 kilometers, 20 to 200 kilometers, 50 to 500 kilometers, 100 meters to 1000 kilometers, or even more.

In other embodiments, the focal distance D specified by the focal distance setting $S_D$ can be an "infinite" focal distance where the focal distance D is equal to infinity. Stated somewhat differently, the focal distance setting $S_D$ can be an infinite focal distance setting $S_\infty$. An infinite focal distance setting $S_\infty$ is a setting that enables the imaging device 110 to focus rays of incident light 10 (shown in FIG. 1) that are parallel to one another. Actual distances that correspond to an "infinite" focal distance can vary, for example, depending on the properties of the imaging device 110. In some embodiments, distances that correspond to an infinite focal distance setting $S_\infty$ are at least 1 meter, 2 meters, 5 meters, 10 meters, 20 meters, 50 meters, 100 meters, 200 meters, 500 meters, 1 kilometer, 5 kilometers, 10 kilometers, 20 kilometers, 50 kilometers, 100 kilometers, 200 kilometers, 500 kilometers, 1000 kilometers, or more, from the imaging device 110. When the imaging device 110 is set to an infinite focal distance setting $S_\infty$, objects 30 in the field of view of the imaging device 110 that are more than the corresponding distance away from the imaging device 110 will appear in focus.

In some embodiments, a distance corresponding to an infinite focal distance setting $S_\infty$ is a multiple m of a focal length f of the lens 112 (shown in FIG. 2) of the imaging device 110. For example, for a 100 millimeter lens and a multiple of 1000 focal lengths, objects 30 that are 100 meters or more away from the imaging device 110 will appear in focus when the imaging device 110 is set to an infinite focal distance setting $S_\infty$. Exemplary multiples m include, for example, 10 focal lengths, 20 focal lengths, 50 focal lengths, 100 focal lengths, 200 focal lengths, 500 focal lengths, 1000 focal lengths, 2000 focal lengths, 5000 focal lengths, 10,000 focal lengths, or even more.

In one embodiment, the predetermined focal distance setting S can be stored in the memory 130 (shown in FIG. 1) of the imaging device 110. In this case, the focal distance setting S can be retrieved from the memory 130 by the processor 120 (shown in FIG. 1) of the imaging device 120. The focal distance setting S can be retrieved, for example, via a direct data connection between the processor 120 and the memory 130. In another embodiment, the focal distance setting S is stored remotely in a memory 230 of a terminal 200 (collectively shown in FIG. 3). In this case, the focal distance setting S can be retrieved from the memory 230 of the terminal 200. The focal distance setting S can be retrieved, for example, via remote communications between the imaging system 100 and the terminal 200, in the manner described in more detail above with reference to FIG. 3.

At 402, the imaging device 110 can be focused according to the focal distance setting S. In some embodiments, the imaging device 110 can be focused by adjusting a focal mechanism 114 (shown in FIG. 2) of the imaging device 110. Adjusting the focal mechanism 114 can include any suitable mechanical movement of the focal mechanism 114 or one or more components thereof. To illustrate the focusing, consider an exemplary focal distance setting $S_{50m}$ for focal distance D=50 meters. The exemplary focal distance setting $S_{50m}$ specifies that objects at a distance of 50 meters from the imaging device 110 are brought into focus when the lens 112 is 10 millimeters away from the photosensor 113. A processor 120 of the imaging system 100 can retrieve a signal that focusing to 50 meters is desired. The processor 120 can thereafter retrieve the focal distance setting $S_{50m}$, for example, from a memory 130 of the imaging system 100 and/or from a terminal 200. The processor 120 can send an appropriate signal to the focal mechanism 114 to adjust a distance between the lens 112 and the photosensor 113 to 10 millimeters. As another example, where the focal distance setting S is an infinite focal distance setting $S_\infty$, the focal mechanism 114 can be adjusted to an infinite focal distance. The above non-limiting examples are provided for illustrative purposes only. Any suitable means of focusing the imaging device 110 can be used in accordance with the systems and methods described herein.

Figure 5:
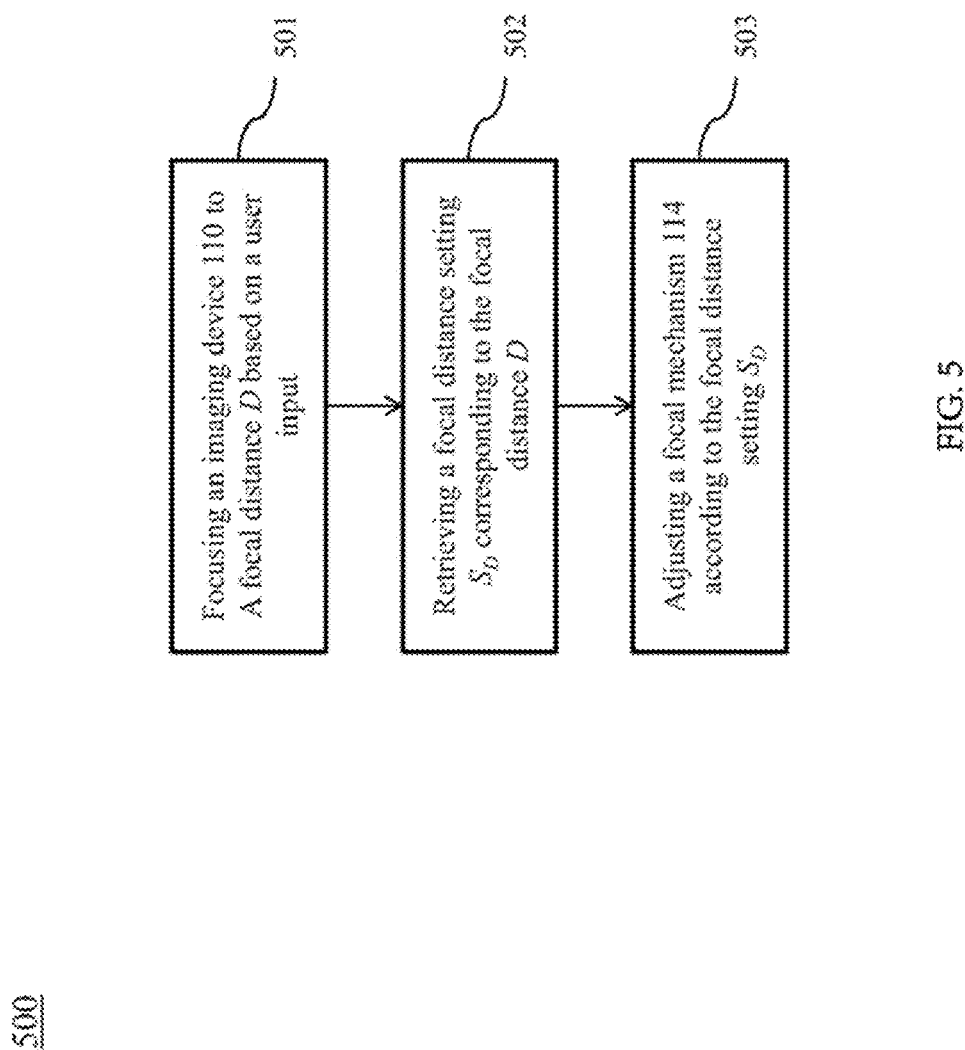
FIG. 5 is an exemplary flow chart illustrating an alternative embodiment of a method for focusing the imaging device of FIG. 1, wherein the focal mechanism of the imaging device is adjusted based on a user input.

Turning now to FIG. 5, an exemplary method 500 is shown for focusing an imaging device 110. At 501, a user 20 (shown in FIG. 1) provides a user input to focus the imaging device 110 to the focal distance D. The user 20 can provide the user input in any suitable manner. For example, the user can provide the user input through one or more input devices 140 of the imaging system 100 (shown in FIG. 1), for example, a button, keyboard, keypad, trackball, and the like. Alternatively, and/or additionally, user can provide the user input through one or more input devices 240 or a terminal 200 (shown in FIG. 3) that is distal from the imaging device 110. For example, the user can enter the user input via an app installed on the terminal 200 (as described above with reference to FIG. 3). In one embodiment, the app includes a "one-touch" focus feature wherein the user can rapidly focus the imaging device 110 with the touch of a single button or like user interface element.

At 502, the user input is received by the imaging device 110 to focus the imaging device 110 to a focal distance D, whereupon a corresponding focal distance setting $S_D$ is desired. In certain embodiments, the focal distance setting $S_D$ is a predetermined focal distance setting $S_D$ that can be retrieved from a memory 130 (shown in FIG. 1) of the imaging device 140 and/or from a memory 230 (shown in FIG. 3) of a terminal 200. In some embodiments, the memory 130 or the memory 230 can advantageously include a table (not shown) (for example, a hash table or lookup table) that maps focal distances D to corresponding focal distance setting $S_D$. Based on the focal distance D, the corresponding focal distance setting $S_D$ can be looked-up and retrieved.

At 503, the focal mechanism 114 of the imaging device 110 can be adjusted according to the focal distance setting $S_D$, as responsive to the user input. In some embodiments, the focal mechanism 114 can have a variable rate of adjustment. A variable rate of adjustment can enable the focal mechanism 114 to be adjusted slowly and/or rapidly depending on the circumstances. For example, in circumstances where fine adjustments to a focus of an imaging device 110 need to be made, gradually adjusting the focal mechanism 114 can be appropriate. Furthermore, where the focal distance setting S is not known in advance or predetermined, focusing can take place through an iterative process of adjusting the focal mechanism 114 and refining the focus through visual feedback. Under these gradual focusing conditions, the focal mechanism 114 can be adjusted slowly or gradually.

In circumstances where gross adjustments to the focus of the imaging device 110 is desirable, rapidly adjusting the focal mechanism 114 can be appropriate. In particular, where the focal distance setting S is known in advance of use or otherwise predetermined, focusing need not take place iteratively as described above. Instead, the focal mechanism 114 can advantageously be rapidly adjusted in accordance with the focal distance setting S. In some embodiments, the focal mechanism 114 has a maximum adjustment rate, and can advantageously be adjusted at the maximum adjustment rate in accordance with the focal distance setting S. Adjusting the focal mechanism 114 rapidly can impart for a user a desired effect of changing to an appropriate focal distance D instantaneously or nearly instantaneously at the user's command. Such rapid focusing can be convenient and time-saving when the user often focuses the imaging device 110 to a focal distance D. For example, an infinite focal distance can be advantageously applied for outdoor imaging applications.

The focal distance setting S can be predetermined and stored in a memory—for example, a memory 130 of the imaging system 100 or a memory 230 of a terminal 200. In some embodiments, the focal distance setting S can be determined prior to being sent to the imaging device 110.

Figure 6:
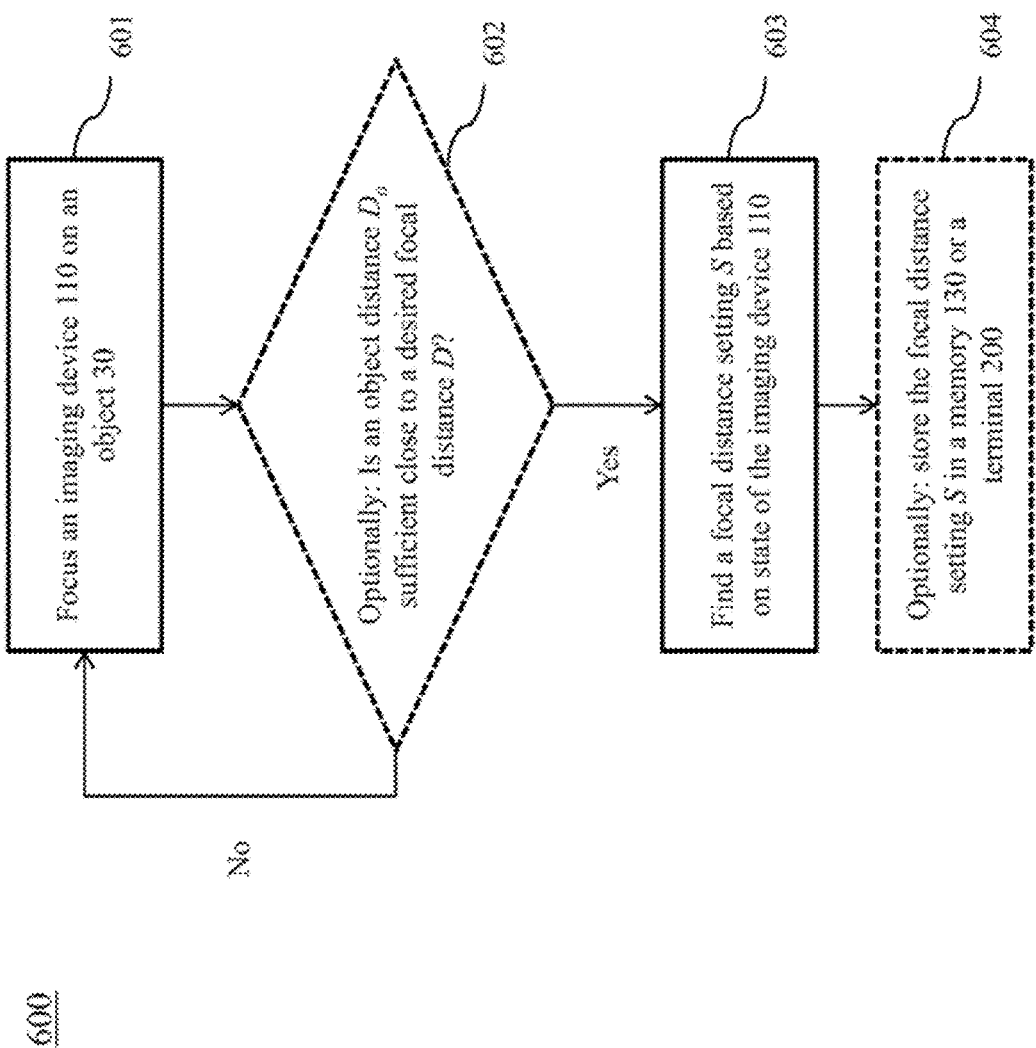
FIG. 6 is an exemplary flow chart illustrating another alternative embodiment of the method for focusing the imaging device of FIG. 1, wherein a focal distance setting of the imaging device is determined.

Turning now to FIG. 6, an exemplary method 600 is shown for determining the focal distance setting S. At 601, an imaging device 110 for which the focal distance setting S will be determined is focused on an object 30. In some embodiments, to determine a focal distance setting $S_D$ for a given focal distance D, the object 30 to be focused upon is at the distance $D_o$ away from the imaging device 110. As a non-limiting example, to determine a focal distance setting $S_{50m}$ for a focal distance D of 50 meters, the imaging device 110 can be focused on an object 30 (such as a nearby building) that is 50 meters away from the imaging device 110. As another non-limiting example, to determine an infinite focal distance setting $S_\infty$, the imaging device 110 can be focused on an object 30 (such as an object on the horizon) that is sufficiently far away from the imaging device 110. Exemplary distances corresponding to an infinite focal distance are provided above with reference to FIG. 4. The object 30 to be focused on to determine the focal distance setting S can be any object 30 at a suitable distance $D_o$. The object 30 can advantageously be a high contrast object that can be easily distinguished from the surroundings of the object 30. In some embodiments, the imaging device 110 can be focused automatically on the object 30. Alternatively, and/or additionally, the imaging device 110 can be focused manually on the object 30.

At 602, the object distance $D_o$ between the object 30 and the imaging device 110 can optionally be verified prior to finding the focal distance setting S. For example, it can be verified as to whether the object distance $D_o$ is sufficiently close to a desired focal distance D. The object distance $D_o$ can be verified based on an image distance $D_i$ of the object 30. For example, the object distance $D_o$ can be found according to the following relationship between the object distance $D_o$, the image distance $D_i$, and a focal length f of the imaging device 110:

$$1/f = 1/D_o + 1/D_i \qquad \text{Equation (1)}$$

As the image distance $D_i$ of the object 30 and focal length f are known parameters, the object distance $D_o$ can be determined based thereon according to Equation (1). Equivalently, the object distance $D_o$ can be verified based on a difference between a reciprocal of the focal length f of the imaging device 110 and a reciprocal of the image distance $D_i$. After the object distance $D_o$ is found, it can be determined whether the object distance $D_o$ is sufficiently close to a desired focal distance D using desired criteria. For example, the object distance $D_o$ can be deemed to be sufficiently close to the desired focal distance D if the object distance $D_o$ is within 0.1 percent, 0.2 percent, 0.5 percent, 1.0 percent, 2.0 percent, 5.0 percent, 10.0 percent, 20.0 percent, 25.0 percent, 40.0 percent, 50.0 percent, 75.0 percent, or 100.0 percent of the desired focal distance D.

Where the desired focal distance D is an infinite focal distance, the object distance $D_o$ approaches infinity, and Equation (1) can be reduced to:

$$f = D_i \qquad \text{Equation (2)}$$

Stated somewhat differently, according to Equation (2), the object 30 can be sufficiently far away from the imaging device 110 for determining an infinite focal distance setting $S_\infty$ when the image distance $D_i$ approaches the focal length f. In some embodiments, a threshold distance $t_\infty$ can be used to verify whether the object is sufficiently far away from the imaging device 30 for purposes of determining an infinite focal distance setting $S_\infty$. For example, the threshold distance $t_\infty$ can be 1 meter, 2 meters, 5 meters, 10 meters, 20 meters, 50 meters, 100 meters, 200 meters, 500 meters, 1 kilometer, 5 kilometers, 10 kilometers, or even more.

If the object distance $D_o$ is found to be not sufficiently close to the desired focal distance D, the imaging device 110 can be re-focused at 601. The imaging device 110 can be re-focused, for example, if the object distance $D_o$ is not sufficiently large or if the object distance $D_o$ is not sufficiently small. In some embodiments, the imaging device can be re-focused on a different object 30 or different portion of the object 30 that is at a more desirable object distance $D_o$. The refocusing process can be repeated until an object distance $D_o$ is found to be sufficiently close to the desired focal distance D, at which point the focal distance setting focal distance setting $S_D$ of the imaging device 110 can be found at 603. The focal distance setting $S_D$ of the imaging device 110 can be found based on a configuration of the focal mechanism 114 (shown in FIG. 2) at the time that the imaging device is focused. For example, where the imaging device 110 has been focused to a focal distance D=50 meters, a distance between a lens 112 and photosensor 113 of the imaging device 110 (for example, 10 millimeters) can be found for the focal distance setting $S_D$.

At 604, the focal distance setting $S_D$ can optionally be stored, for example, for later use. In some embodiments, the focal distance setting $S_D$ can be stored in a memory 130 of the imaging device 110. In other embodiments, the focal distance setting $S_D$ can be stored in a terminal 200 that is distal from the imaging device 110.

Figure 7:
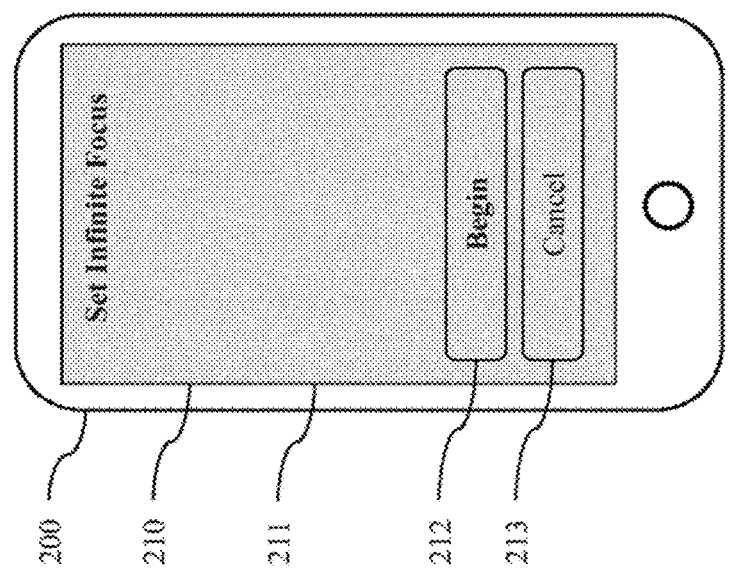
FIG. 7 is an exemplary drawing illustrating an embodiment of a user interface for determining a focal distance setting and focusing the imaging device of FIG. 1 based on the focal distance setting.

Turning now to FIG. 7, an exemplary user interface 210 is shown as operating on the terminal 200 for focusing the imaging device 110 (shown in FIG. 1). As shown in FIG. 7, the user interface 110 can be configured to interact with a user 20 (shown in FIG. 1) to determine a focal distance setting $S_D$ of the imaging device 110. The user interface 210 can include a first focus-setting window 211 that prompts the user to initiate determination of the focal distance setting $S_D$. The first focus-setting window 211 can include any desired user interface elements including, for example, a "Begin" button 212 that the user can press to initiate a process for determining the focal distance setting $S_D$. The first focus-setting window 211 can further include, for example, a "Cancel" button 213 that the user can press to cancel the process for determining the focal distance setting $S_D$. Although illustrated with respect to an infinite focal distance setting $S_\infty$ in FIG. 7, a user interface 210 can be similarly used to determine any desired focal distance setting $S_D$ and/or focus the imaging device 110 to the focal distance setting $S_D$.

Figure 8:
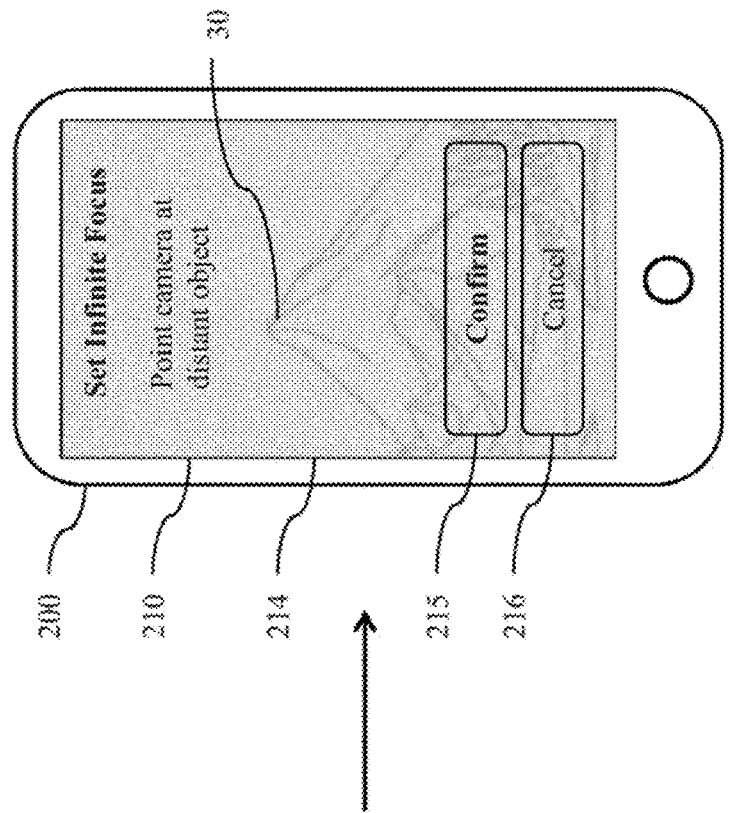
FIG. 8 is an exemplary diagram illustrating an alternative embodiment of the user interface of FIG. 7, wherein a focal distance setting is determined by interaction with a user.
Figure 8:
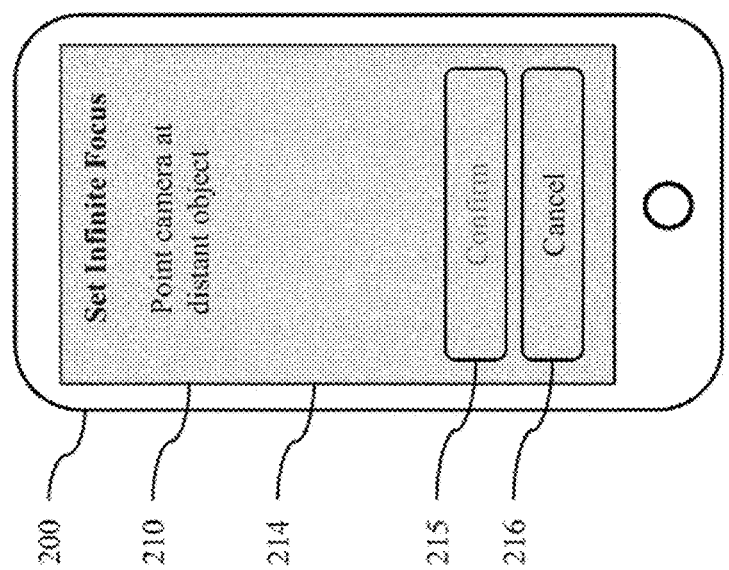

Turning now to FIG. 8, an alternative embodiment of the user interface 210 is shown as supporting additional interactions with a user 20 (shown in FIG. 1) to determine a focal distance setting $S_D$. The user interface 210 can include a second focus-setting window 214 that prompts the user 20 to assist in determining the focal distance setting $S_D$. For example, the second focus-setting window 214 can instruct the user 20 to direct the imaging device 110 to an object 30 at a suitable object distance $D_o$. For example, to determine an infinite focal distance setting $S_\infty$, the second focus-setting window 214 can display instructions to the user to direct the imaging device 110 to an object 30 that is far away or at an object 30 that is at least a specified distance away from the imaging device 110. In response, the user can direct the imaging device 110 using a joystick, controller, or other similar control mechanism. As the field-of-view of the imaging device 110 changes under user control, the object distance $D_o$ to the object 30 being imaged can be verified in the manner described above with reference to FIG. 6. In some embodiments, the object distance $D_o$ can be verified in real-time as the object 30 in the field-of-view of the imaging device 110 changes. The object distance $D_o$ alternatively can be verified in time delayed manner. The second focus-setting window 213 is shown as including a confirmation button 215 that allows the user to confirm the object 30 being imaged for determining the focal distance setting $S_D$. The confirmation button 215 can be inactive (for example, grayed out and/or unable to accept user input) if a suitable object 30 is not within the field-of-view imaging device 110. Once an object 30 at a suitable object distance $D_o$ is found, confirmation button 214 can be activated to enable the user to confirm the focal distance setting $S_D$. The second focus-setting window 213 can also include a cancel button 216 to cancel determination of the focal distance setting $S_D$.

Figure 9:
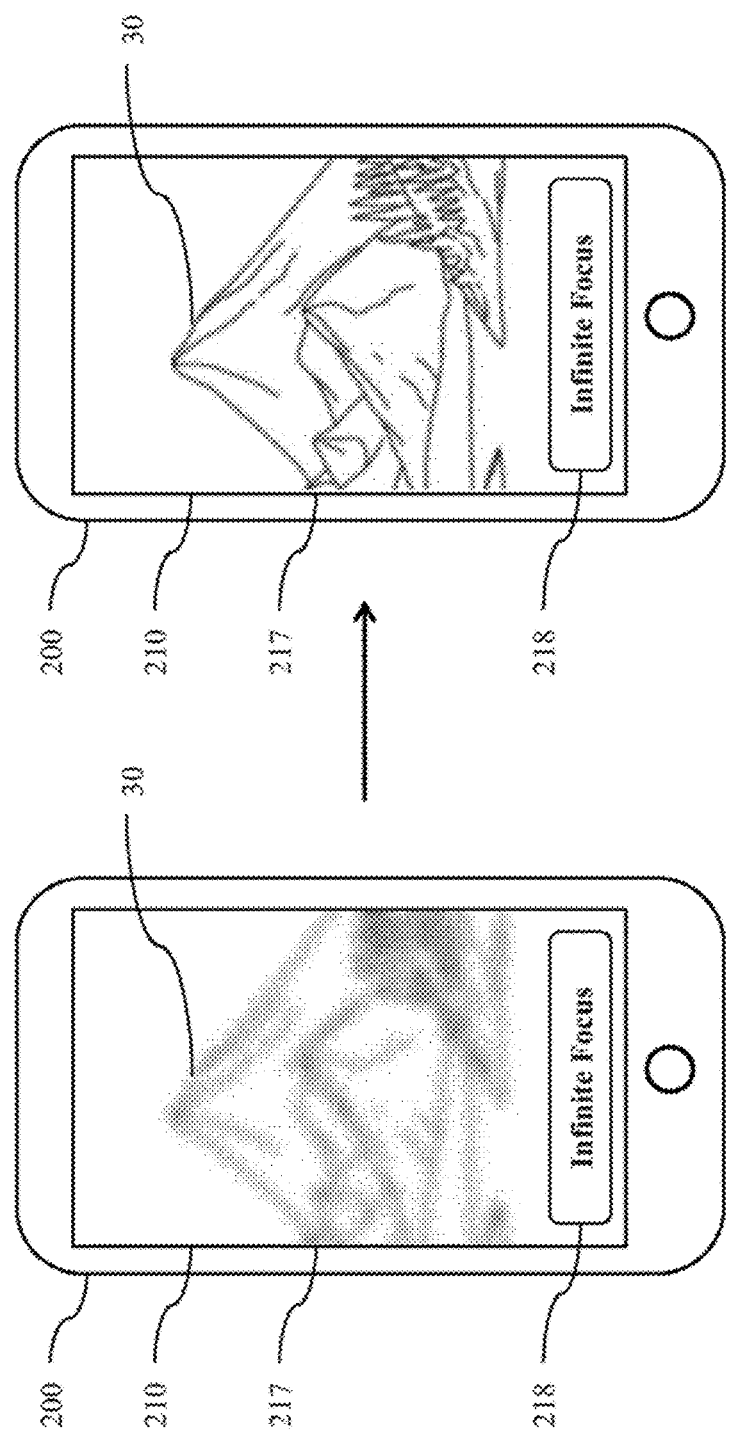
FIG. 9 is an exemplary diagram illustrating another alternative embodiment of the user interface of FIG. 7, wherein the imaging device can be focused according to a focal distance setting based on activation of the user interface.

FIG. 9 shows another alternative embodiment of the user interface 210. As illustrated in FIG. 9, the user interface 210 can operate on a terminal 200 for interacting with a user 20 (shown in FIG. 1) to focus an imaging device 110 according to a focal distance setting $S_D$. The user interface 210 can include a third focus-setting window 217 that prompts a user to focus the imaging device 110. The third focus-setting window 217 can include a button 218 or other user interface element by which the user can trigger a focusing operation according to a focal distance setting $S_D$. For example, as illustrated in FIG. 9, the user interface 210 can include an "Infinite Focus" button 218 that the user can press as desired to rapidly focus the imaging device 110 to an infinite focal distance. As shown in FIG. 9, distant objects 30 in a field-of-view of the imaging device 110 are rapidly brought into focus after the button 218 is pressed. The button 218 can thereby trigger focusing of the imaging device 110 in response to a one-touch user input from the user 20.

Figure 10:
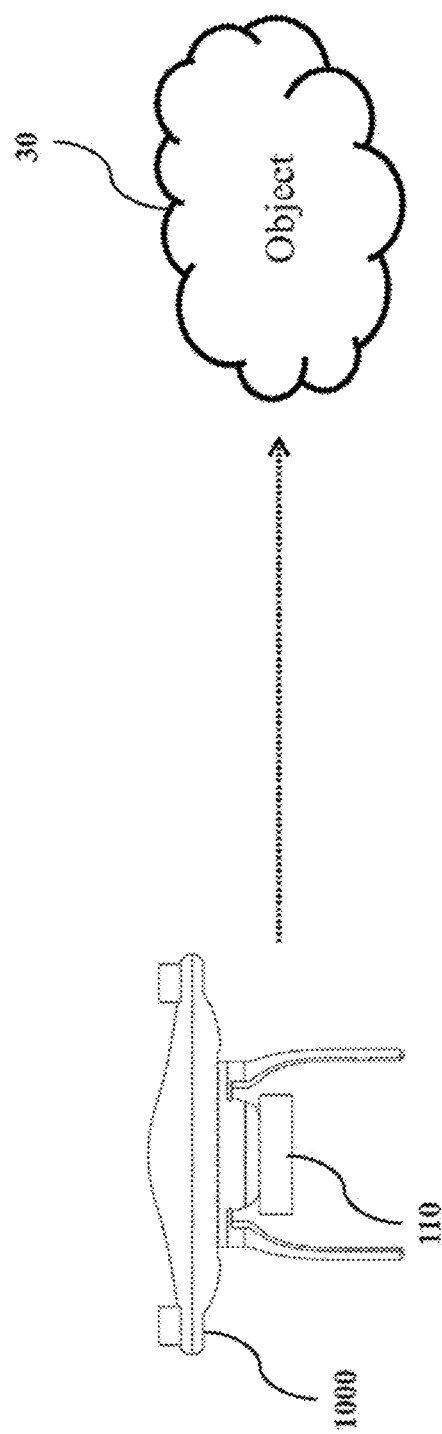
FIG. 10 is an exemplary diagram illustrating still another alternative embodiment of the imaging system of FIG. 1, wherein the imaging system is mounted aboard an unmanned aerial vehicle.

In some embodiments, one or more components of the imaging system 100 can be installed on (for example, mounted on) a mobile platform (for example, on a fuselage of the mobile platform). As illustrated in FIG. 10, the mobile platform can be an unmanned aerial vehicle (UAV) 1000. UAVs 1000, colloquially referred to as "drones," are aircraft without a human pilot onboard the vehicle whose flight is controlled autonomously or by a remote pilot (or sometimes both). UAVs are now finding increased usage in civilian applications that require various forms of aerial data-gathering. Various types of UAVs 1000 are suitable for use in imaging applications. One suitable type of UAV 1000, for example, is an aerial rotorcraft that is propelled by multiple rotors. One suitable type of rotorcraft has four rotors and is known as a quadcopter, quadrotor helicopter, or quad rotor. Exemplary quadcopters suitable for the present systems and methods for image focusing include numerous models currently available commercially. UAVs 1000 suitable for the present systems and methods further include, but are not limited to, other rotor designs such as single rotor, dual rotor, trirotor, hexarotor, and octorotor designs. Fixed wing UAVs 1000 and hybrid rotorcraft-fixed wing UAVs 1000 can also be used in connection with the present systems and methods. The disclosed focusing systems and methods are especially advantageous for use in UAVs 1000, since UAVs are frequently used in outdoor environments for imaging distant objects 30. Focusing to an infinite focal distance is often desired for distance objects 30. In some embodiments, an initial determination of the focal distance setting can be made in response to installation of an imaging device 110 aboard a mobile platform—for example, aboard a UAV 1000.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method of focusing an imaging device, comprising:
focusing the imaging device on a first object;
obtaining a threshold distance of the first object when an image distance of the first object approximately equals a focal length of the imaging device;
storing a focal distance setting based on the threshold distance as a predetermined infinite focal distance setting;
focusing the imaging device on a second object;
obtaining an object distance between the second object and the imaging device according to an image distance of the second object and the focal length of the imaging device;
validating the object distance in response to the object distance being greater than a preset object distance for determining an infinite focal distance, including prompting, through a user interface, a user to direct the imaging device to the second object that is at the object distance greater than the preset object distance;
enabling a one-touch button on the user interface in response to the object distance being validated;
retrieving the predetermined infinite focal distance setting of the imaging device in response to a user input on the one-touch button; and
focusing the imaging device to an infinite focal distance by adjusting a focal mechanism of the imaging device according to the predetermined infinite focal distance setting.

2. The method of claim 1, wherein retrieving the predetermined infinite focal distance setting comprises retrieving the predetermined infinite focal distance setting in response to the user input on the one-touch button of the user interface of a terminal that is distal from the imaging device.

3. The method of claim 1, wherein retrieving the predetermined infinite focal distance setting comprises retrieving the predetermined infinite focal distance setting from a memory of the imaging device.

4. A system comprising:
an imaging device having a focal mechanism for focusing the imaging device on a first object; and
one or more processors electrically connected to the imaging device, and configured to:
obtain a threshold distance of the first object when an image distance of the first object approximately equals a focal length of the imaging device; and
store a focal distance setting based on the threshold distance as a predetermined infinite focal distance setting, wherein:
the imaging device is further configured to focus on a second object, and
the one or more processors are further configured to:
obtain an object distance between the second object and the imaging device according to an image distance of the second object and the focal length of the imaging device;
validate the object distance in response to the object distance being greater than a preset object distance for determining an infinite focal distance, including prompting, through a user interface, a user to direct the imaging device to the second object that is at the object distance greater than the preset object distance;
enable a one-touch button on the user interface in response to the object distance being validated;
retrieve the predetermined infinite focal distance setting of the imaging device in response to a user input on the one-touch button; and
control the focal mechanism to focus the imaging device to an infinite focal distance according to the predetermined infinite focal distance setting.

5. The system of claim 4, wherein the one or more processors are further configured to retrieve the predetermined infinite focal distance setting in response to the user input on the one-touch button of the user interface of a terminal that is distal from the imaging device.

6. The system of claim 4, wherein the one or more processors are further configured to adjust the focal mechanism of the imaging device according to the predetermined infinite focal distance setting.

7. The system of claim 6, wherein the one or more processors are further configured to adjust the focal mechanism at a maximum adjustment rate of the focal mechanism.

8. The system of claim 4, wherein the one or more processors are further configured to determine the predetermined infinite focal distance setting.

9. The system of claim 8, wherein the one or more processors are further configured to determine the predetermined infinite focal distance setting by: determining the predetermined infinite focal distance setting based on a state of the imaging device.

10. A mobile platform comprising:
a fuselage;
an imaging device installed on the fuselage and having a focal mechanism for focusing the imaging device on a first object; and
one or more processors electrically connected to the imaging device, and configured to:
obtain a threshold distance of the first object when an image distance of the first object approximately equals a focal length of the imaging device;
store a focal distance setting based on the threshold distance as a predetermined infinite focal distance setting, wherein:
the imaging device is further configured to focus on a second object, and
the one or more processors are further configured to:
obtain an object distance between the second object and the imaging device according to an image distance of the second object and the focal length of the imaging device;

validate the object distance in response to the object distance being greater than a preset object distance for determining an infinite focal distance, including prompting, through a user interface, a user to direct the imaging device to the second object that is at the object distance greater than the preset object distance;

enable a one-touch button on the user interface in response to the object distance being validated;

retrieve the predetermined infinite focal distance setting of the imaging device in response to a user input on the one-touch button; and control the focal mechanism to focus the imaging device to an infinite focal distance according to the predetermined infinite focal distance setting.

11. The mobile platform of claim 10, wherein the one or more processors are further configured to retrieve the predetermined infinite focal distance setting in response to the user input on the one-touch button of the user interface of a terminal that is distal from the imaging device.

12. The mobile platform of claim 10, wherein the one or more processors are further configured to adjust the focal mechanism of the imaging device according to the predetermined infinite focal distance setting.

13. The mobile platform of claim 12, wherein the one or more processors are further configured to adjust the focal mechanism at a maximum adjustment rate of the focal mechanism.

14. The mobile platform of claim 10, wherein the one or more processors are further configured to determine the predetermined infinite focal distance setting.

15. The mobile platform of claim 14, wherein the one or more processors are further configured to determine the predetermined infinite focal distance setting by: determining the predetermined infinite focal distance setting based on a state of the imaging device.

16. The mobile platform of claim 15, wherein the one or more processors are configured to automatically focus the imaging device on the object.

* * * * *